INVENTOR
Volker Hahn
BY
PATENT AGENT

INVENTOR
Volker Hahn
BY
PATENT AGENT 3,099,109
DEVICE FOR ANCHORING TENSIONING ELEMENTS
Volker Hahn, Stuttgart-Degerloch, Germany, assignor to Ed. Zublin A.G., Stuttgart, Germany
Filed May 26, 1958, Ser. No. 737,936
Claims priority, application Germany Mar. 1, 1958
4 Claims. (Cl. 50—128)

The present invention relates to anchoring tensioning elements and, more specifically, to the simultaneous anchoring of a plurality of tensioning wires. When simultaneously anchoring a plurality of separate tensioning wires, the problem involved consists in so anchoring such wires that they will not slip or slide with regard to each other. The solution to this problem is difficult for the reason that the cross section of the wires varies and also the dimensions of the anchoring body and wedges used in connection with such anchoring procedure likewise vary. While these variations may be within the tolerances permitted during the manufacturing process, nevertheless, generally a slip of the individual wires occurs.

In order to remedy this situation, it was heretofore suggested to employ only few wires or cables which, if not in excess of three, can be statistically ascertained and secured. If, however, more than three wires or cables are employed, a plurality of wedges will be necessary. Furthermore, it was suggested to employ a soft deformable wedge which will adapt itself to the rolling tolerances. It has also been suggested to employ flat wires provided with transverse ribs or corrugations and to press such wires into metal plates or metal sheets. Generally a plate was arranged on each side of the respective flat wire.

It is an object of the present invention to provide an arrangement for anchoring or clamping of tensioning elements such as wires or cables, which will improve and facilitate the heretofore known clamping arrangements of the type involved.

It is also an object of this invention to provide a clamping or anchoring arrangement of the type set forth in the preceding paragraph, which will prevent the wires or cables to be clamped from being weakened from notch effects or the like.

These and other objects and advantages of the invention will appear more clearly from the following specification in connection with the accomapnying drawings, in which.

FIGS. 7 to 10 respectively illustrate sections through further embodiments of the invention with a wedge between wires of the wire strand.

Figure 11:
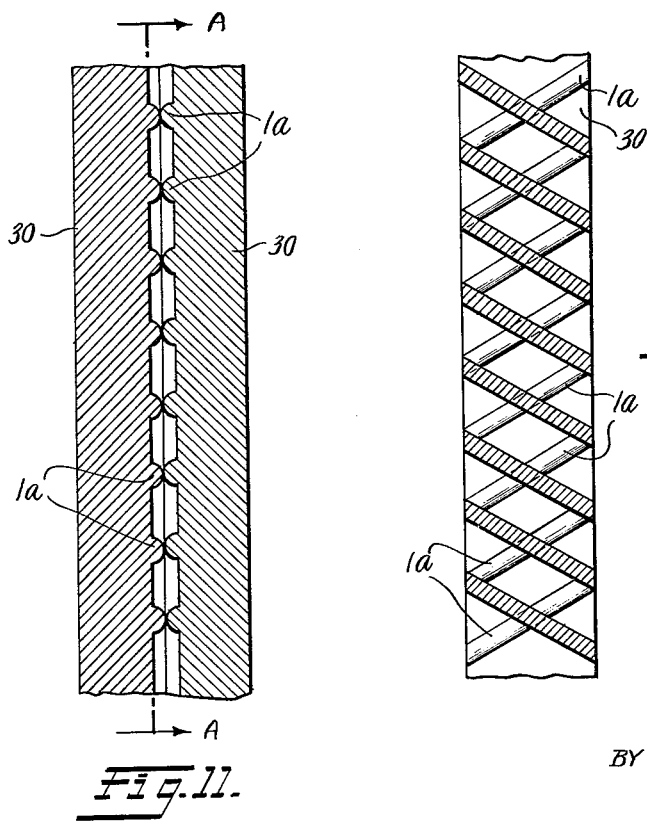
Figure 12:
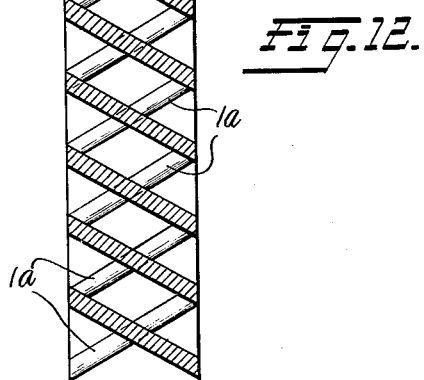

FIG. 11 is an enlarged view taken in cross-section showing the manner in which the inclined ribs on respective wire surface engage each other. FIG. 12 is a view taken along line A—A of FIG. 11.

The anchoring or clamping arrangement according to the present invention for clamping tensioning elements such as wires, cables or the like is characterized primarily in that the tensioning wires, which are provided with transverse ribs or corrugations preferably inclined with regard to the longitudinal extension of the wires, are placed one upon each other so that the ribs or corrugations of each adjacent wire cross each other and by a transverse pressure are pressed into each other. In this way, the wires inter-engage each other in a manner similar to the mutual meshing of gears so that in spite of rolling tolerances of the wires they cannot slip or slide any longer relative to each other. Inasmuch as the ribs or corrugations are pressed into each other at the crossing points only, the strength of the wire will not be affected by a notch effect. The transverse pressure may, for instance, be caused by a wedge which may be located laterally of said wires or therebetween. If desired, the pressure may, of course, also be produced by a press and the wires thus clamped together may then be maintained in their position by screws or the like. When employing a wedge, care should be taken that by reducing the slip of the wires, the friction between wedge and wire will be less than the friction between wire and wall of the anchoring or clamping body. To this end, the wire adjacent the wedge may on that side which faces the wedge be free from ribs, or in order to reduce the friction between wedge and wire, an intermediate layer of sheet mtal may be inserted. In order to increase the durability or life of the clamping arrangement, it is expedient to make the inclination of the wedge greater than the inclination of the effective surfaces of the anchoring body.

Figure 1:
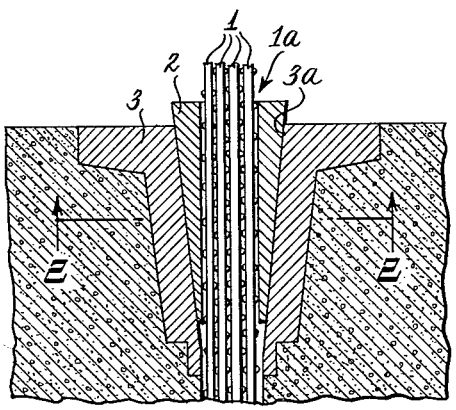
FIG. 1 illustrates a section through a first clamping or anchoring arrangement according to the present invention.
Figure 2:
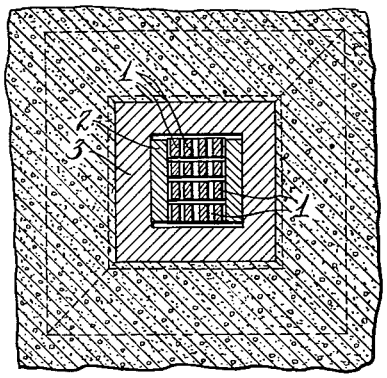
FIG. 2 is a section along the line 2—2 of FIG. 1.

Referring now to the drawings in detail, and FIGS. 1 and 2 thereof in particular, the clamping or anchoring system shown therein illustrates wires 1 with inclined ribs 1a. The arrangement furthermore comprises two wedges 2 respectively located on the outside of the two outermost wires. The wedges are driven into an anchoring body 3 with inner inclined surfaces 3a. In this way, the wires 1 are without intermediate layer pressed against each other whereby the ribs of the wires are pressed into each other so that also the inner wires are firmly anchored.

Figure 3:
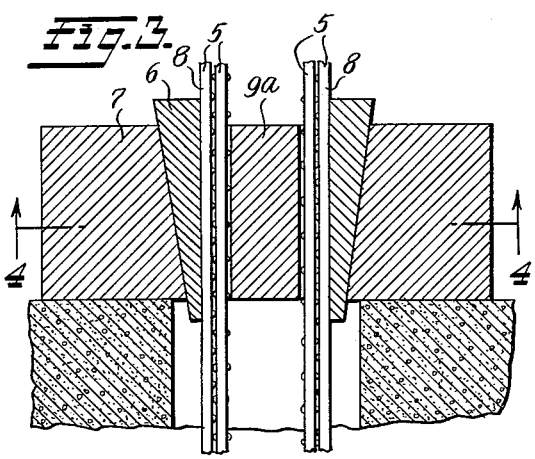
FIG. 3 is a section through a modified clamping arrangement according to the present invention.
Figure 4:
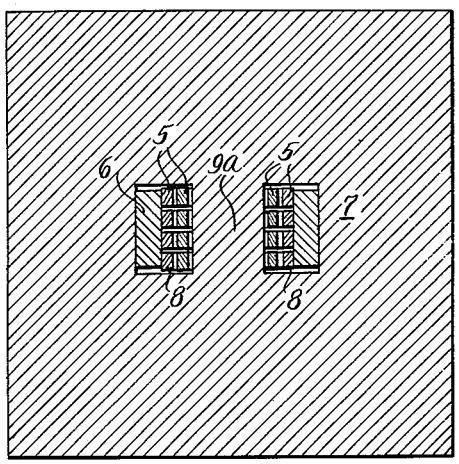
FIG. 4 is a section along the line 4—4 of FIG. 3.

According to the arrangement of FIGS. 3 and 4, wires 5 with transverse ribs are by wedges 6 pressed against an anchoring body 7 so that the ribs of the wires are again pressed into each other. However, in contrast to the arrangement of FIG. 1, the outer wires 8 have their outer surface facing the respective adjacent wedge arranged smooth, i.e. without ribs. Furthermore, a web 9a of anchoring body 9 extends between the wires as is clearly shown in FIGS. 3 and 4.

Figure 5:
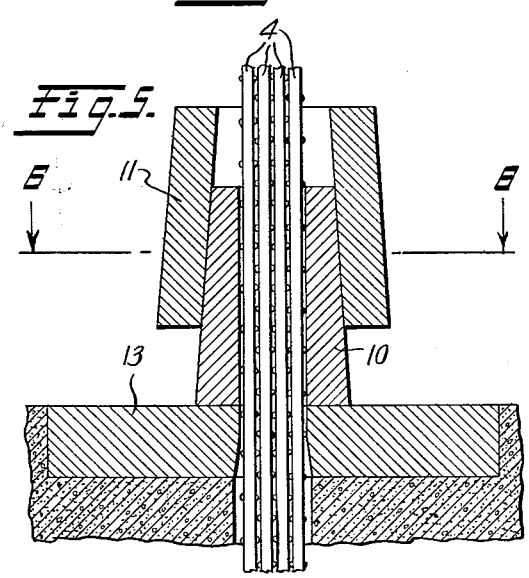
FIG. 5 represents a section through a further modification of a clamping system according to the present invention employing wedges on both sides of the wires to be anchored.
Figure 6:
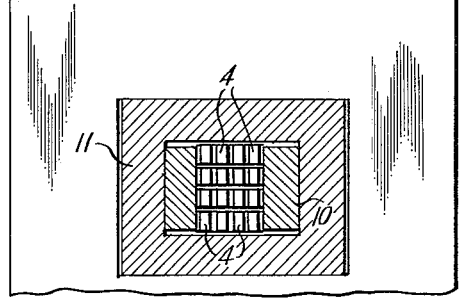
FIG. 6 is a section taken along the line 6—6 of FIG. 5.
Figure 1:
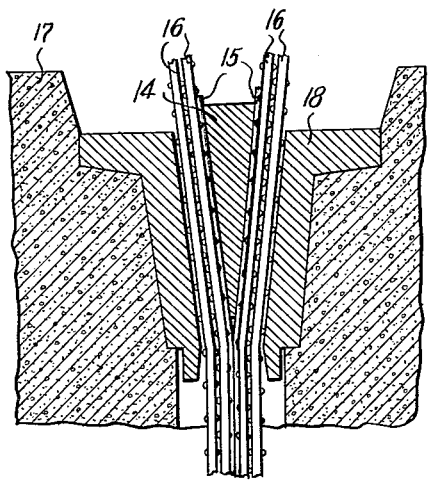

According to the embodiment shown in FIGS. 5 and 6, wedges 10 having the wires 4 arranged therebetween are in their turn engaged by a sleeve 11 with inner cone-shaped surfaces corresponding to the taper of the wedges so that the sleeve 11 presses the wedges 10 and thereby the wires 4 together. The distribution of this force upon the concrete to which the wires are to be anchored is effected by a base plate 13.

The embodiment of FIG. 7 shows an anchoring system with a wedge 14 located between the ribbed wires 16. Wedge 14 slides on metal sheets 15 within the innermost wires 16. It will be appreciated that in this way the wires 16 are pressed against the anchoring body 18 embedded in the concrete 17.

Figure 8:
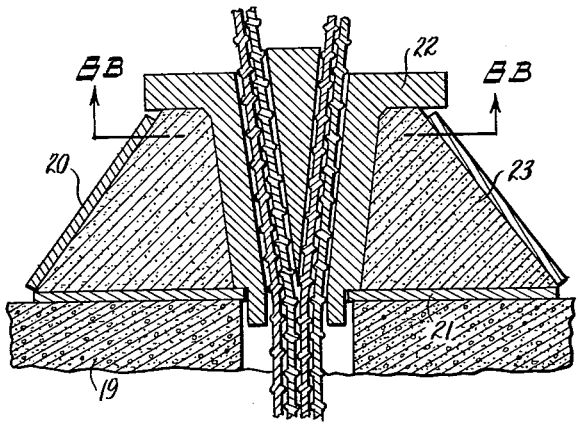

The arrangement according to FIG. 8 differs from that of FIG. 7 primarily in that the anchoring body 22 is placed upon the concrete only after the latter has hardened.

The anchoring body 22 is mounted in relatively cheap filling material such as, for instance mortar which latter is confined in a tapered sheet metal body for instance of steel. The base plate 21 of said sheet metal body is substantially soft and creep-resistant.

Figure 9:
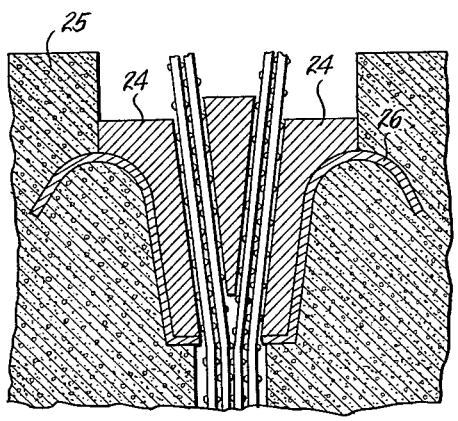
Figure 8B:
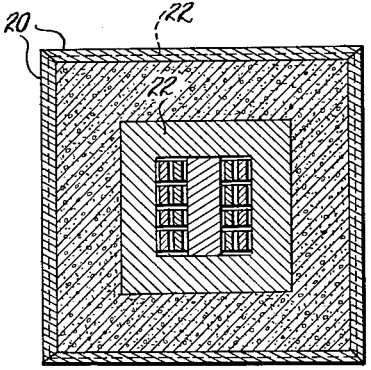

In conformity with the arrangement shown in FIG. 9, the anchoring body 24 is inserted after the concrete 25 has hardened. As will be evident from FIG. 9, the anchoring body 24 rests upon a sheet metal body 26 which at the same time absorbs the transverse tension stresses in the concrete.

Figure 10:
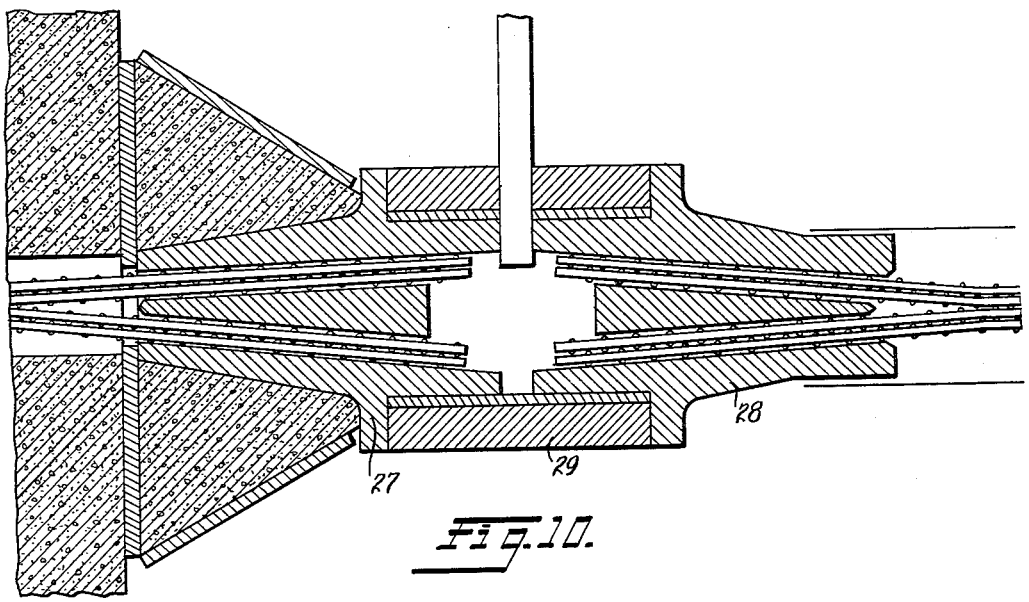

FIG. 10 illustrates a coupling between two clamping or anchoring units. After the anchoring body 27 has been pre-tensioned, the second anchoring body 28 will, after the wires have been anchored therein, be connected to the first anchoring body by means of a box nut 29, retaining nut, screws or other convenient means.

In FIGS. 11 and 12 two wires 30 are shown for purposes of clarity, each being assumed to bear ridges 1a on the opposite side only, it being understood that the wires have been brought into contact but have not yet been subjected to sufficient pressure to deform the ridges 1a. In FIG. 12 the crisscross orientation of the ridges on the respective wires is illustrated.

It is, of course, to be understood that the present invention is, by no means, limited to the particular constructions shown in the drawings but also comprises any modifications within the scope of the appended claims.

What I claim is:

1. In combination: an anchoring body, a plurality of wires at least a portion of each of said wires being provided with a plurality of protruding ribs inclined with regard to the longitudinal direction of said wire and spaced from each other in said longitudinal direction of said wire, said portions of said wires extending into said anchoring body, said spaced ribs of one wire being inclined oppositely to and crossing said spaced ribs of another wire, said ribs resting in each other at said crossing points, wedge means extending into said anchoring body and exerting lateral pressure on said portions of said wires for holding said portions of said wires in their respective position whereby said lateral pressure causes deformation of said ribs at said crossing points and prevents slippage between said portions of said wires.

2. In combination: a pair of tension units each comprising an anchoring body and a plurality of wires held against slippage therein, each tension unit comprising a combination substantially as set forth in claim 1.

3. In combination: a pair of tension units each comprising an anchoring body and a plurality of wires held against slippage therein, each tension unit comprising a combination substantially as set forth in claim 1, the wires in each tension unit extending therefrom in a direction away from the other tension unit.

4. In combination: an anchoring body having tapering inner surfaces, a plurality of groups of wires respectively provided with protruding ribs inclined with regard to the longitudinal direction of said wires and spaced from each other in said longitudinal direction of said wires, each of said groups of wires having a portion thereof extending through said anchoring body, the wires of each group having opposed faces in contiguous face-to-face relationship, the spaced ribs on one of the opposed wire faces being inclined oppositely to the spaced ribs on the other wire face, said oppositely inclined ribs crossing each other and wedge means extending into said anchoring body and interposed between said portions of said groups of wires, said wedge means exerting lateral pressure upon said wires substantially in a direction perpendicular to the longitudinal direction thereof for maintaining the wires of said groups of wires in their respective positions whereby said lateral pressure causes deformation of the cross ribs at their points of intersection and prevents slippage between said wires in the groups.

References Cited in the file of this patent

UNITED STATES PATENTS

| | | |
|---|---|---|
| 931,320 | Large | Aug. 17, 1909 |
| 1,151,947 | Havemeyer | Aug. 31, 1915 |
| 1,202,336 | Varney | Oct. 24, 1916 |
| 1,202,359 | Braumuller | Oct. 24, 1916 |
| 2,180,866 | Cryer | Nov. 27, 1939 |
| 2,210,058 | Blackburn | Aug. 6, 1940 |
| 2,216,758 | Schmidt | Oct. 8, 1940 |
| 2,341,922 | King et al. | Feb. 15, 1944 |
| 2,751,660 | Nakonz | June 26, 1956 |
| 2,763,464 | Leonhardt | Sept. 18, 1956 |

FOREIGN PATENTS

| | | |
|---|---|---|
| 955,818 | Germany | Jan. 10, 1957 |
| 775,744 | Great Britain | May 29, 1957 |